United States Patent
Lin et al.

(10) Patent No.: US 11,305,435 B2
(45) Date of Patent: Apr. 19, 2022

(54) ROBOT AND ROBOT CONTROL METHOD

(71) Applicant: AmTRAN Technology Co., Ltd., New Taipei (TW)

(72) Inventors: Kao-Min Lin, New Taipei (TW); Yu-Ruei Li, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 229 days.

(21) Appl. No.: 16/740,481

(22) Filed: Jan. 12, 2020

(65) Prior Publication Data
US 2020/0230823 A1 Jul. 23, 2020

(30) Foreign Application Priority Data
Jan. 21, 2019 (TW) .................................. 108102302

(51) Int. Cl.
*B25J 13/08* (2006.01)
*G05D 1/02* (2020.01)
*B25J 5/00* (2006.01)

(52) U.S. Cl.
CPC ............. *B25J 13/089* (2013.01); *B25J 5/007* (2013.01); *B25J 13/086* (2013.01); *G05D 1/0219* (2013.01); *G05D 1/0238* (2013.01)

(58) Field of Classification Search
CPC ........ B25J 13/086; B25J 13/089; B25J 5/007; G05D 1/0238; G05D 1/0242; G05D 2201/0216
USPC ............ 700/258; 901/1, 33, 46; 180/8.6, 21, 180/901
See application file for complete search history.

(56) References Cited

U.S. PATENT DOCUMENTS

| | | | |
|---|---|---|---|
| 2015/0197012 A1* | 7/2015 | Schnittman | G05D 1/027 700/250 |
| 2016/0166126 A1* | 6/2016 | Morin | A47L 9/2805 15/319 |
| 2016/0235270 A1* | 8/2016 | Santini | A47L 9/0411 |
| 2016/0236343 A1* | 8/2016 | Neumann | A47L 9/2889 |
| 2018/0263447 A1* | 9/2018 | Yim | A47L 9/2852 |

FOREIGN PATENT DOCUMENTS

| | | |
|---|---|---|
| CN | 108748158 A | 11/2018 |
| TW | 201730705 A | 9/2017 |
| TW | 201818175 A | 5/2018 |
| TW | M568401 U | 10/2018 |

* cited by examiner

*Primary Examiner* — Dalena Tran
(74) *Attorney, Agent, or Firm* — CKC & Partners Co., LLC

(57) ABSTRACT

A robot includes a sensing circuit, a driving circuit, and a processor. The sensing circuit includes a first sensor and a second sensor. The first sensor is configured to receive a first sensing signal and the second sensor is configured to receive a second sensing signal. The driving circuit is configured to control an operation of a roller circuit and to control a forward direction of the roller circuit. The processor is coupled to the sensing circuit and the driving circuit. When the processor determines that, according to the first sensing signal and the second sensing signal, a sensing target is a bridge, the processor controls the roller circuit through the driving circuit to adjust the forward direction, such that the robot gets across the bridge.

18 Claims, 9 Drawing Sheets

US 11,305,435 B2

ROBOT AND ROBOT CONTROL METHOD

CROSS-REFERENCE TO RELATED APPLICATION

This application claims priority to and the benefit of Taiwan Application Serial Number 108102302, filed on Jan. 21, 2019, the entire content of which is incorporated herein by reference as if fully set forth below in its entirety and for all applicable purposes.

BACKGROUND

Field of Disclosure

The disclosure generally relates to robot and method, and more particularly, to robot and robot control method.

Description of Related Art

Since technology development, a robot which is applied in manufacture industry and our daily life has become more and more popular. However, a robot's moving track varies based on a variety of environment. As a result, a robot confronts obstacles while a robot propels itself. A robot's task is brought to a halt.

Accordingly, how to detect obstacles of environment effectively while a robot propels itself and how to prevent from getting stuck in any situation are urgent problems to be solved.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect directed towards a robot includes a sensing circuit, a driving circuit, and a processor. The sensing circuit includes a first sensor and a second sensor. The first sensor is configured to receive a first sensing signal and the second sensor is configured to receive a second sensing signal. The driving circuit is configured to control an operation of a roller circuit and to control a forward direction of the roller circuit. The processor is coupled to the sensing circuit and the driving circuit. When the processor determines that, according to the first sensing signal and the second sensing signal, a sensing target is a bridge, the processor controls the roller circuit through the driving circuit to adjust the forward direction, such that the robot gets across the bridge.

One aspect directed towards a robot control method includes steps of: receiving a first sensing signal of a first sensor and a second sensing signal of a second sensor; and when a determination is made, according to the first sensing signal and the second sensing signal, that a sensing target is a bridge, controlling a driving circuit to driving a roller circuit to adjust a forward direction such that the robot gets through bridge.

It is to be understood that both the foregoing general description and the following detailed description are by examples, and are intended to provide further explanation of the disclosure as claimed.

DETAILED DESCRIPTION

Figure 1:
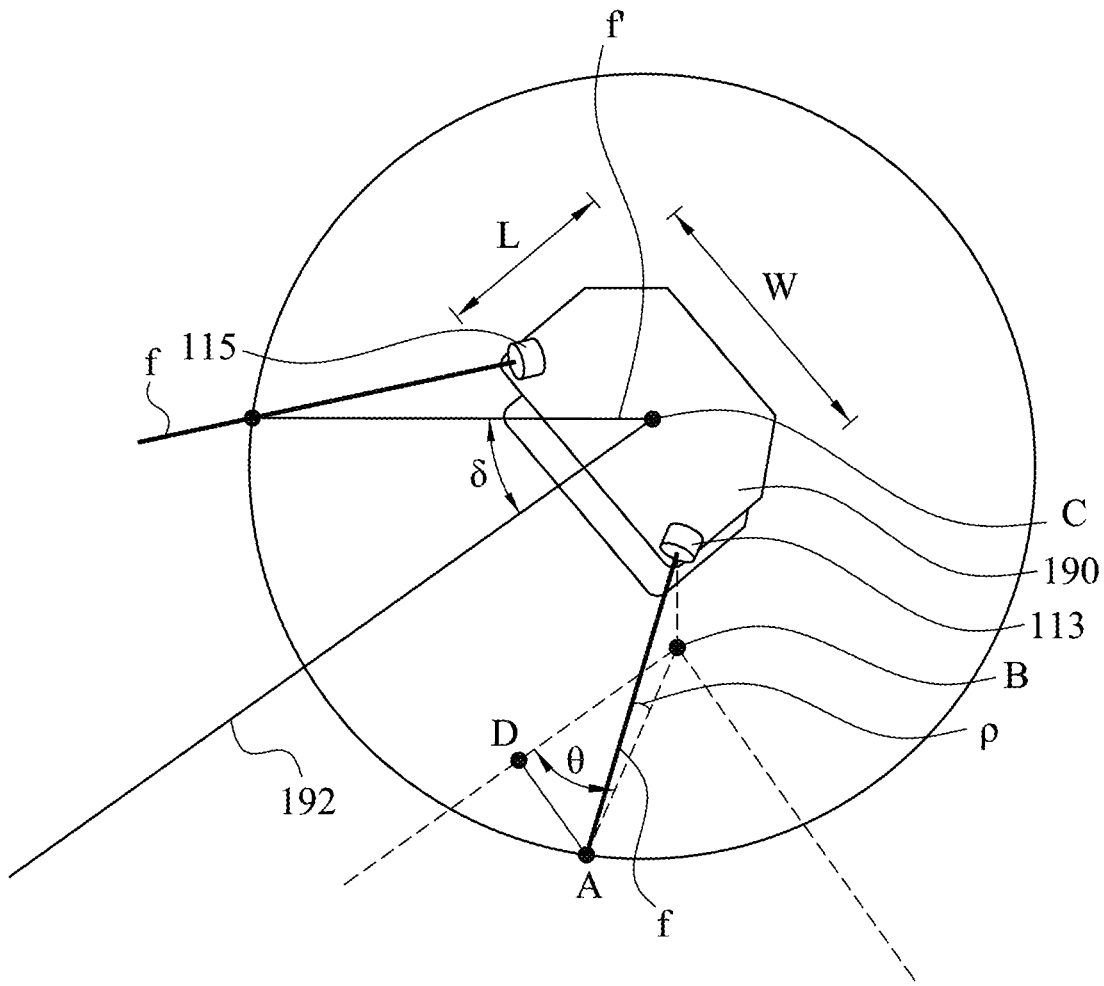
FIG. 1 is a top view of a robot and a block diagram in accordance with some aspects of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a top view of a robot 100 and a block diagram in accordance with some aspects of the present disclosure. As shown in FIG. 1, the robot 100 includes a housing 190. In some embodiments, sensing circuits, such as a first sensor 113 and a second sensor 115 of FIG. 1, are disposed on the top plane of the housing 190. The first sensor 113 and the second sensor 115 are disposed on a first position and a second position of the top plane of the housing 190 respectively (such as near a corner of the top plane). For example, the first position is one corner on the top plane of the housing 190, and the second position is another corner on the top plane of the housing 190. The two corners are located at the top plane of the housing 190 which side is close to a forward direction of the robot 100.

The first sensor 113 and the second sensor 115 receive a first sensing signal and a second sensing signal respectively, in order to compute a distance between the robot 100 and a sensing target. In some embodiments, the first sensor 113 and the second sensor 115 are sensors which are the same type and/or have the same function. The following description takes the first sensor 113 as an example for illustrating how to compute distance among elements. The first sensor 113 and the second sensor 115 can be, but are not limited to, time-of-flight sensors (TOF). In some embodiments of computing the distance, the sensors emit light, such as infrared light, and then the IR light which is reflected from the sensing target is received. The time difference which IR light is transmitted and received can be used to compute the distance between the sensor and the sensing target. A person of ordinary skill in the art can apply other sensors or means for computing distance in the present disclosures.

As shown in FIG. 1, the first sensor 113 is disposed on the top plane of the robot 100 with an angle ρ between the top plane and the ground, in order to receive a first sensing signal. A distance f between the first sensor 113 and a point A on the ground can be calculated by using the first sensing signal. An angle θ is from a front direction to a left side of the first sensor 113. An angle ρ is from a horizontal plane of the first sensor 113 to a downward side. In some embodiments, the first sensor 113 is disposed stably on the top of the housing 190. When the robot 100 moves, the angle θ and the angle ρ of the first sensor 113 remain unchanged. A point C is the center in a two-dimension plane of the housing 190. The length $\overline{AB}$ can be obtained by the angle ρ from the length $\overline{AB}$ to the length $\overline{AE}$, i.e., $\overline{AB}$=f cos ρ. The lengths $\overline{AD}$ and $\overline{BD}$ can be obtained by the angle θ from the length $\overline{AB}$ to the length $\overline{BD}$, i.e., $\overline{AD}$=f cos ρ sin θ and $\overline{BD}$=f cos ρ cos θ. Because the center point C is located at the center of the housing 190, the length f' between the center point C and the point A on the ground where the position is sensed (that is, the length $\overline{AC}$) can be calculated by a half-length L and a half-width W of the housing 190, which is $$f' = \sqrt{\left(f\cos\rho\cos\theta + \frac{L}{2}\right)^2 + \left(f\cos\rho\sin\theta + \frac{W}{2}\right)^2}.$$

Figure 2A:
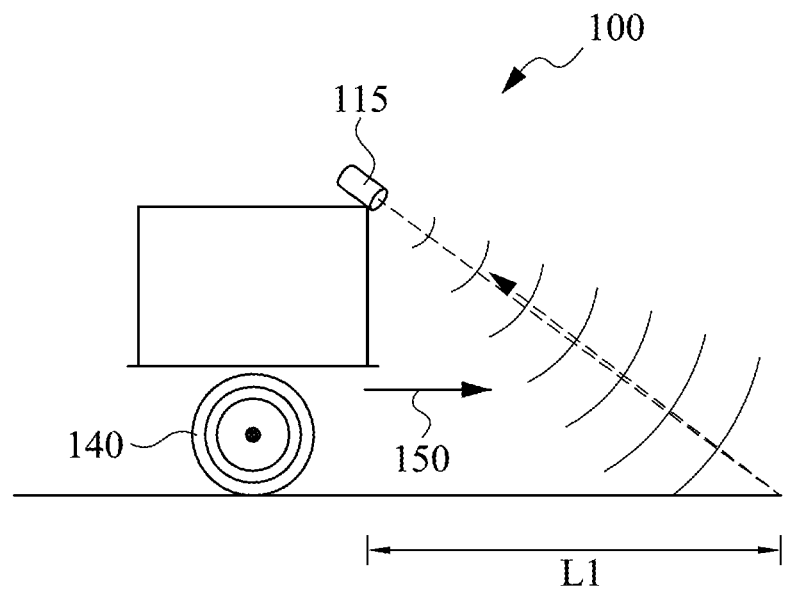
FIG. 2A is a side view of the robot in FIG. 1 during sensing in accordance with some aspects of the present disclosure.
Figure 2B:
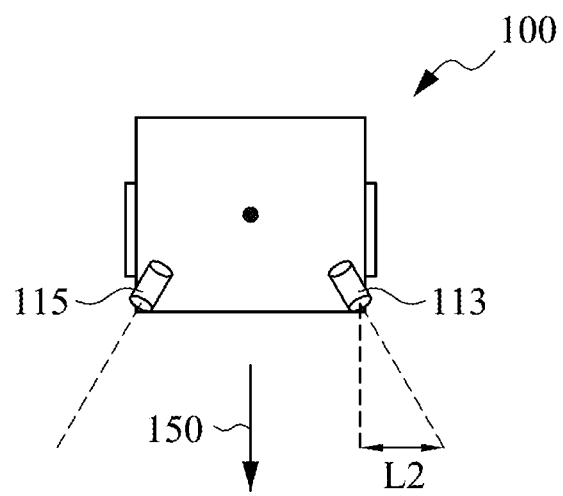
FIG. 2B is a top view of the robot during sensing in FIG. 1 in accordance with some aspects of the present disclosure.

Reference is made to FIG. 2A, which is a side view of the robot 100 in FIG. 1 during sensing in accordance with some aspects of the present disclosure. As shown in FIG. 2A, a roller circuit 140 of the robot 100 moves along a forward direction 150. The second sensor 115 receives a sensing signal which is reflected from the ground, and then a sensing length L1 (such as the length $\overline{BD}$, f cos ρ cos θ of FIG. 1) between the front of the robot 100 (such as the forward direction 150) and the ground is obtained. FIG. 2B is a top view of the robot 100 in FIG. 1 during sensing in accordance with some aspects of the present disclosure. As shown in FIG. 2B, the first sensor 113 receives the sensing signal which is reflected from the ground, and then a sensing width L2 (such as the length $\overline{AD}$, f cos ρ sin θ of FIG. 1) from the front of the robot 100 (such as the forward direction 150) to the left side.

Figure 3:
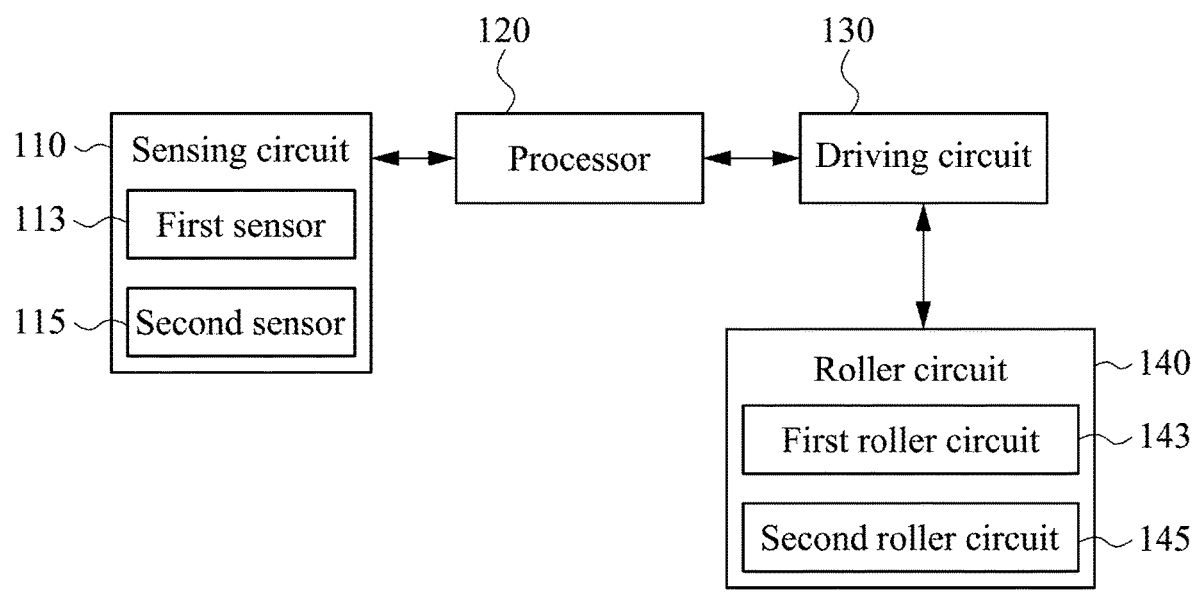
FIG. 3 is a block diagram of the robot in accordance with some aspects of the present disclosure.

Reference is made to FIG. 3, which is a block diagram of the robot 100 in accordance with some aspects of the present disclosure. As shown in FIG. 3, the robot 100 includes a sensing circuit 110, a processor 120, a driving circuit 130, and the roller circuit 140. The sensing circuit 110 and the driving circuit 130 are coupled to the processor 120 respectively. The sensing circuit 110 includes one or more sensors. In some embodiments, the sensing circuit 110 includes the first sensor 113 and a second sensor 115, which has been described above. The roller circuit 140 is coupled to the driving circuit 130. The driving circuit 130 is configured to drive the roller circuit 140, for example, controlling the forward direction of the roller circuit 140. The roller circuit 140 includes one or more roller circuits. In some embodiments, the roller circuit 140 includes a first roller circuit 143 and a second roller circuit 145. The driving circuit 130 can control each roller circuit's operation, such that the robot 100 moves accurately. Because the robot 100 may moves in any type of environment and identifies different type of environment, the robot 100 will determine what type of environment currently stayed according to the sensing signal which is received by the sensing circuit.

Figure 4:
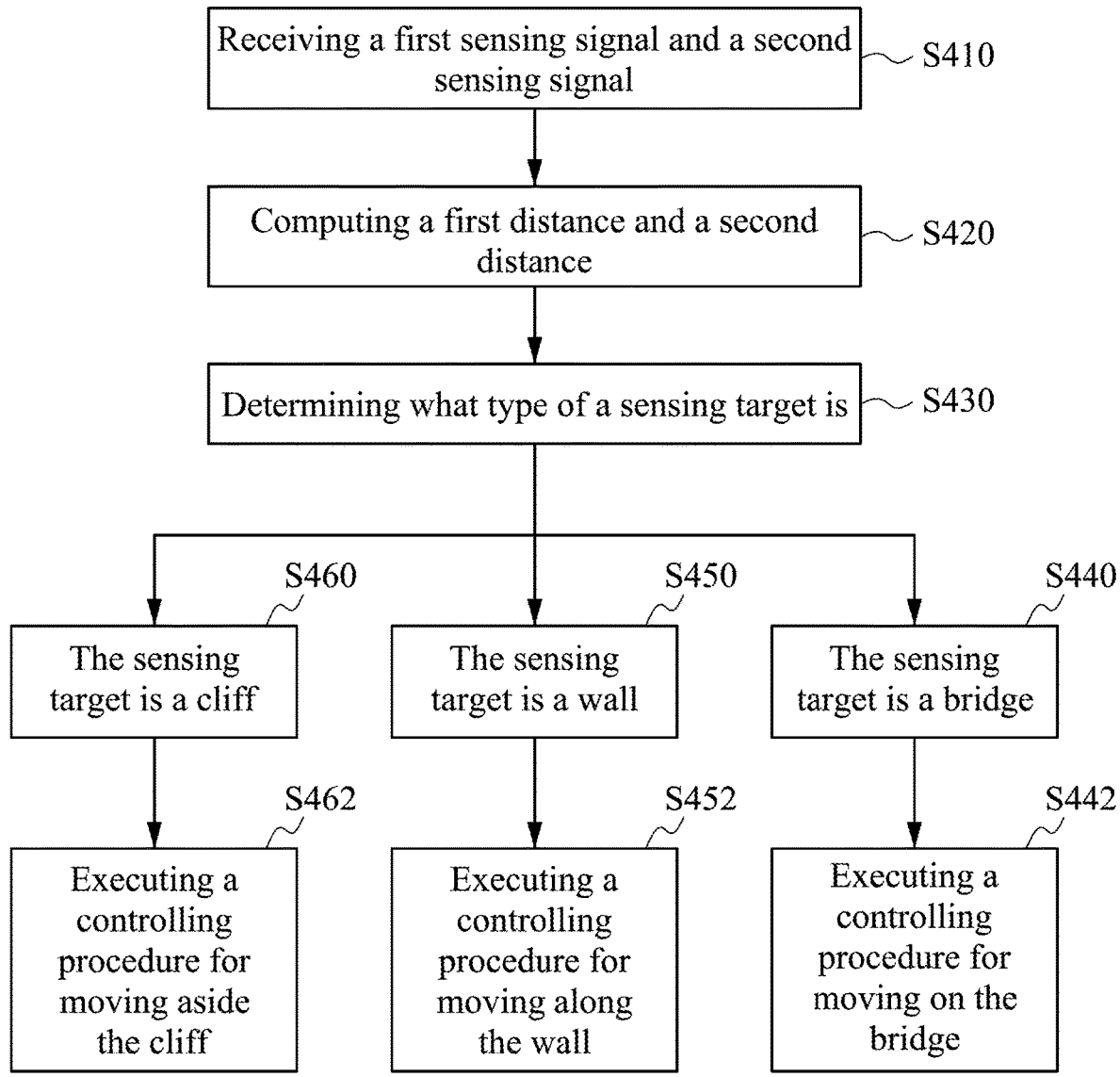
FIG. 4 is a flow chart illustrating how to determine a type of a sensing target when the robot works during moving in accordance with some aspects of the present disclosure.

Reference is made to FIG. 4, which is a flow chart illustrating how to determine a type of a sensing target when the robot 100 works during moving in accordance with some aspects of the present disclosure. The following description is incorporated with FIG. 3 and FIG. 4. The robot 100 propels itself on the ground. In some embodiments, the robot 100 moves on a flat ground. In step S410, the first sensor 113 receives the first sensing signal in the meanwhile the second sensor 115 receives the second sensing signal. In step S420, the processor 120 computes a distance (i.e., a first distance) between the robot 100 and the sensing target according to the first sensing signal, and computes a distance (i.e., a second distance) between the robot 100 and the sensing target according to the second sensing signal. In step S430, a determination is made which level the first distance and the second distance fall within. For example, if the distance is smaller than a first threshold (such as 30 centimeter), the distance falls in the level "short". For example, if the distance is between the first threshold and a second threshold (such as 100 centimeters), the distance falls in the level "normal". For example, of the distance is larger than the second threshold, the distance falls in the level "long". As shown in TABLE 1 below, the first distance and the second distance which fall within the level "short" and/or "long" can be used to determine that the robot 100 has been on the environment of a bridge. The environment of the bridge is, for example, a width of a pavement is approximately the same, and the pavement extends for a distance, such that its appearance looks like a long and narrow plane.

TABLE 1

| distance condition | | |
| --- | --- | --- |
| The first distance | The second distance | The type of the sensing target |
| long | short | bridge |
| short | long | bridge |
| long | long | bridge |
| short | short | bridge |

In step S440, if the sensing target is identified as the bridge, in step S442, the controlling procedure for moving on the bridge is executed.

Figure 5:
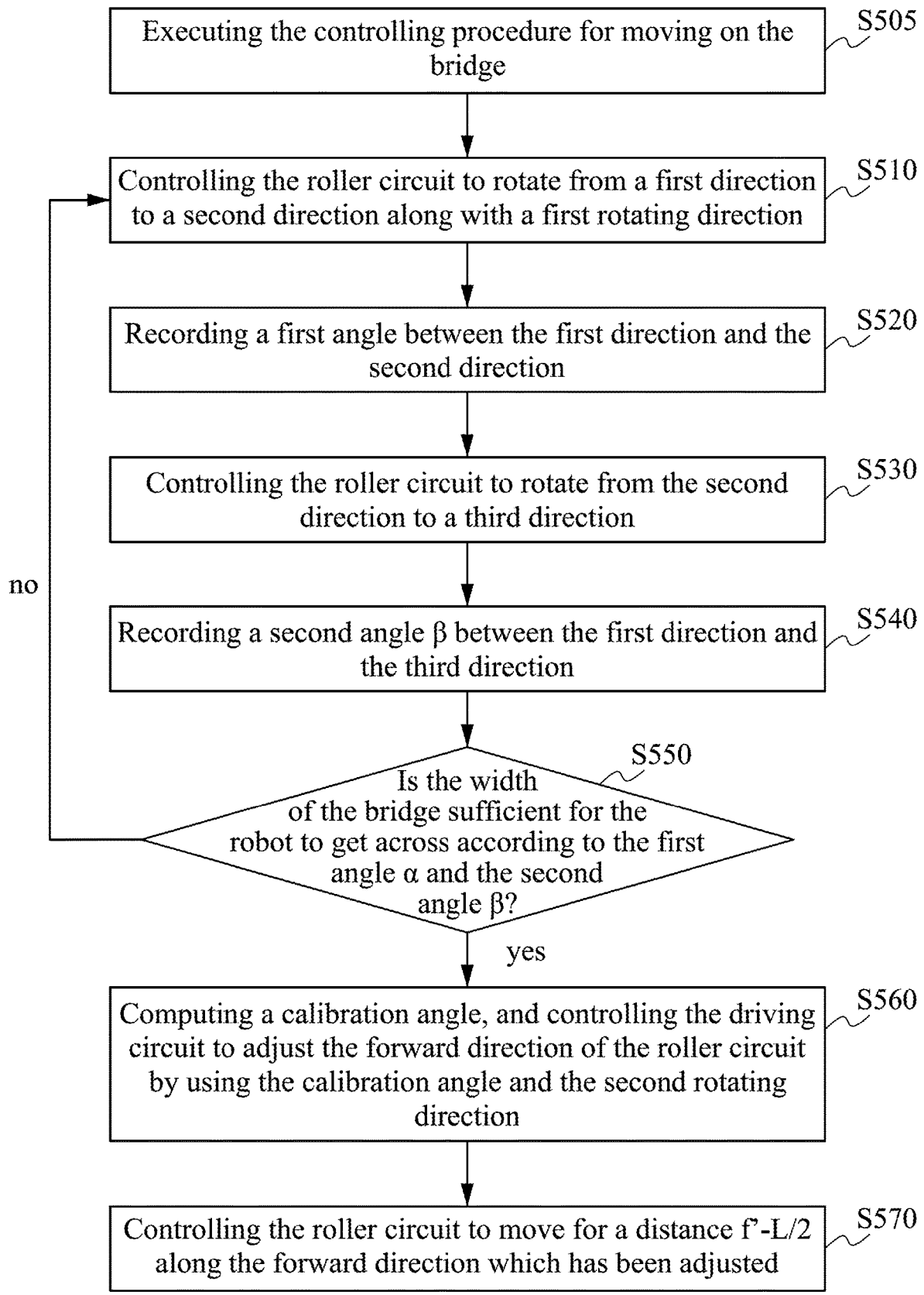
FIG. 5 is a flow chart illustrating that the sensing target is identified to be a bridge and how to control the robot on the bridge in accordance with some aspects of the present disclosure.

Reference is made to FIG. 5, which is a flow chart illustrating that the sensing target is identified to be a bridge 615 and how to control the robot 100 on the bridge 615 in accordance with some aspects of the present disclosure. The following description is incorporated with FIGS. 6A-6F. FIGS. 6A-6F illustrate a top view that the robot 100 is controlled to move on the bridge 615 when the sensing target is identified to be the bridge 615 in accordance with some aspects of the present disclosure.

Figure 6C:
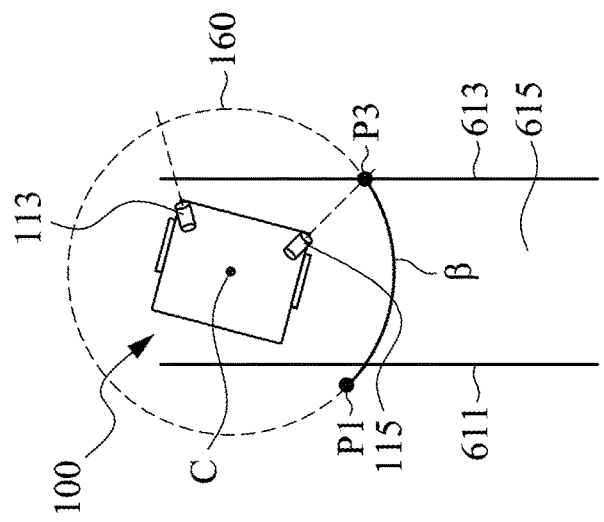
FIGS. 6A-6F illustrate a top view that the robot is controlled to move on the bridge when the sensing target is identified to be a bridge in accordance with some aspects of the present disclosure.
Figure 6B:
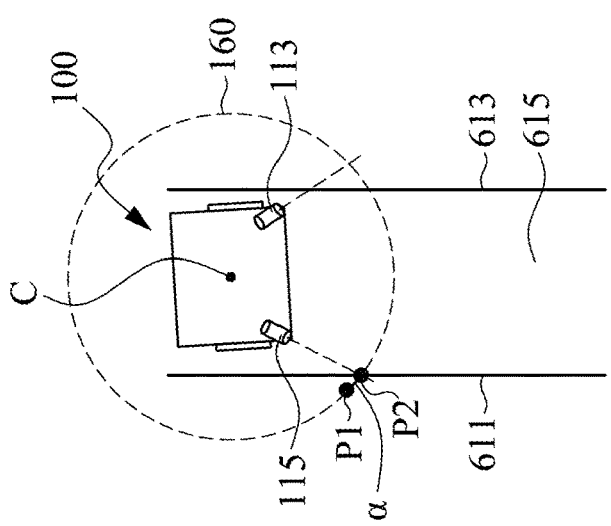
Figure 6A:
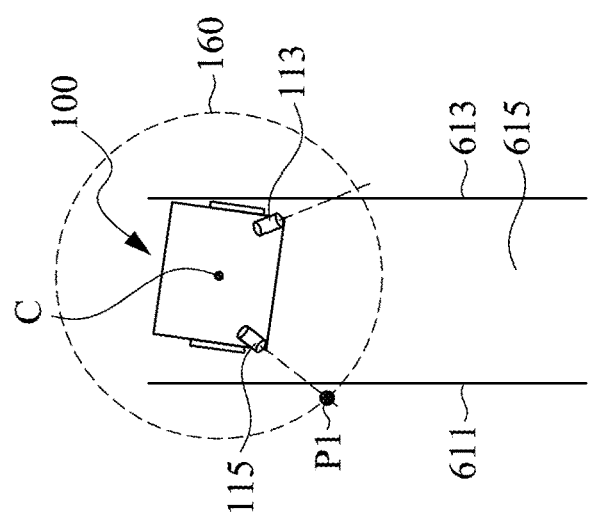

When the robot 100 of FIG. 6A identifies the environment which the robot 100 moves on or is about to move on the bridge 615, in step S505, the control procedure is executed. In step S510, the processor 120 controls the driving circuit 130 to drive the roller circuit 140, such that the robot 100 rotates from a first direction. In some embodiments, the robot 100 rotates along the first rotating direction, such as counterclockwise, until the second sensor 115 detects a first side 611 of the bridge 615 at the second direction. In some embodiments, the first direction is a pointing direction at the beginning of the second sensor 115 (such as the direction pointed to the point P1). The second direction is the direction where the second sensor 115 points when detecting the first side 611 of the bridge 615 (such as the direction pointed to the point P2 of FIG. 6B). In some embodiments, the robot 100 operates with the sensing signal of the second sensor 115. In another embodiment, the robot 100 can also operate with the sensing signal of the first sensor 113.

In step S520, the processor 120 records a first angle α between the first direction and the second direction. For example, the first angle α is a radian on a circle sensing range 160 of FIG. 6B between the point P1 and the point P2, or the angle which is computed by the radian which is between the point P1 and the point P2. In step S530, the processor 120 controls the driving circuit 130 to drive the roller circuit 140, such that the roller circuit 140 keeps rotating from the second direction to a third direction where the second sensor 115 detects a second side 613 of the bridge 615 at the third direction. In some embodiments, the third direction is the direction where the second sensor 115 points when detecting the second side 613 of the bridge 615 (such as the direction pointed to the point P3 of FIG. 6C).

In step S540, a second angle β between the first direction and the third direction is recorded. For example, the first angle β is a radian on the circle sensing range 160 of FIG. 6C between the point P1 and the point P3, or the angle which is computed by the radian which is between the point P1 and the point P3. The second angle β is larger than the first angle α. In step S550, the processor 120 determines, according to the first angle α and the second angle β, whether the width of the bridge 615 is sufficient for the robot 100 to get across. In some embodiments, the processor 120 determines whether it can get across by using function (1) below:

$$\beta - \alpha > \frac{W}{f\prime} \times 90. \qquad \text{function (1)}$$

If the determination by a result of the function (1) is YES, the flow chat goes to step S560. In step S560, the processor 120 computes a calibration angle, and controls the driving circuit 130 to adjust the forward direction of the roller circuit 140 by using the calibration angle which is computed above and the second rotating direction. In some embodiments, the calibration angle is computed by function (2):

$$\text{calibration angle} = \frac{\beta - \alpha}{2} + \delta \qquad \text{function (2)}$$

$$\text{which } \delta = \tan^{-1} \frac{\frac{W}{2} + f\cos\rho\sin\theta}{\frac{L}{2} + f\cos\rho\cos\theta}$$

Figure 6F:
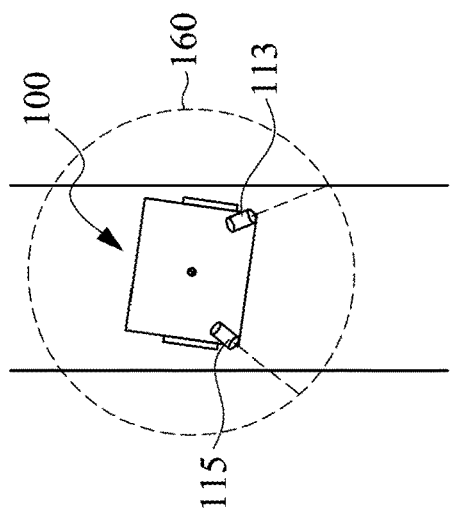
Figure 6E:
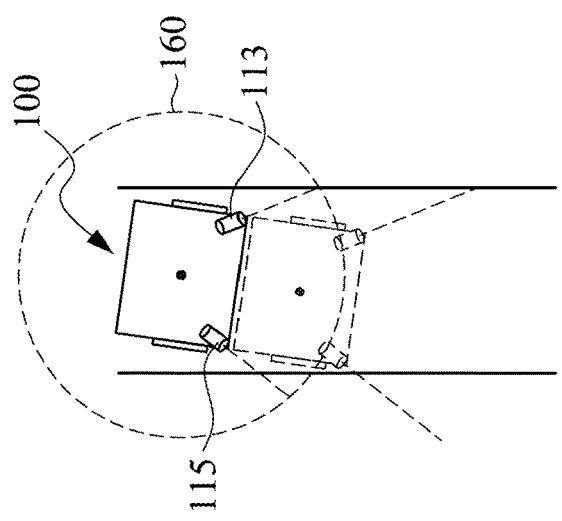
Figure 6D:
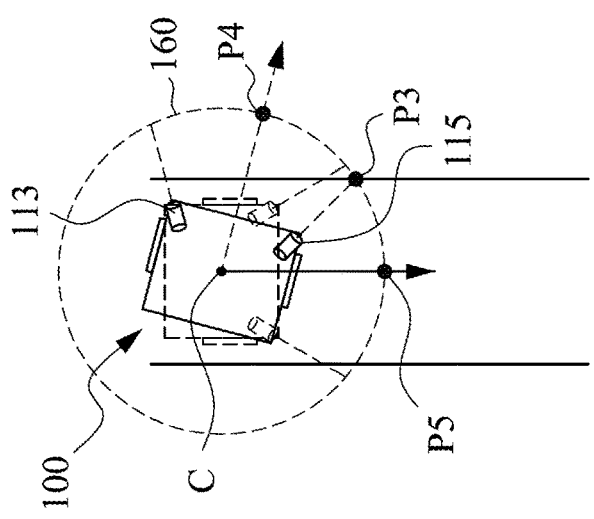

The robot 100 rotates the calibration angle along a second rotating direction, which the second rotating direction is different from the first rotating direction. As shown in FIG. 6D, the robot 100 rotates the calibration angle clockwise, such that the forward direction 650 of the robot 100 is approximately the same with the pavement of the bridge 615. In step S570, the driving circuit 130 controls the roller circuit 140 to move for a distance along the forward direction which has been adjusted, such as f′−L/2. As shown in FIGS. 6E-6F, the robot 100 moves along the forward direction which has been adjusted.

In some embodiments, the robot 100 subtracts the first angle from the second angle to have the difference for many times, and then calculates the average of the differences to have an average of the differences. The robot 100 calculates a sum of the average of the differences and the sensing included angle (i.e., the angle δ of FIG. 1) to be the calibration angle. The sensing included angle is the angle between a line 192, which extends forward from the central point C of the robot 100, and the sensing circuit 110, as the angle δ shown in FIG. 1.

On the other hand, if the determination in step S550 that the robot 100 cannot across the bridge 615, the flow chart goes back to step S510 for controlling to rotate the roller circuit 141.

In some embodiments, after step S570, the flow chart goes back to step S510 for controlling to rotate the roller circuit 141 in order to adjust the forward direction. For example, if the forward direction which has been adjusted makes the robot 100 move toward the second side 613 of the bridge 615, that is, the distance between the forward direction and the wall has not been remained a fixed distance, the flow chart goes back to the aforesaid step which adjusts the forward direction again until the forward direction of the robot 100 is approximately parallel with the pavement of the bridge 615.

Detecting the first side 611 and the second side 613 of the bridge 615 to obtain the angle or the radian in order to compute the width of the bridge 615 provides an evaluation if the robot 100 can keep moving forward or the robot 100 should rotate 180 degrees in order to prevent any obstacle. Furthermore, the calibration angle is applied to adjust the forward direction of the robot 100 for satisfying the pavement of the bridge 615, such that the robot 100 can preventing from colliding with the sides of the bridge 615. Therefore, the robot 100 moves on the bridge 615 well.

It should be noted that the robot 100 of FIGS. 6A-6F illustrates some embodiments for detecting the pavement width of the bridge 615. For ease of understanding the present disclosure, TABLE 2 below illustrates possible procedures for controlling the bridge 615 in step S560.

TABLE 2

| procedures for controlling the bridge in step S560 | | |
|---|---|---|
| The first rotating direction of the robot | The sensor which detects the pavement of the bridge | |
| | The first sensor | The second sensor |
| Clockwise | The calibration angle which is used to control the robot to rotate counterclockwise is $\frac{\beta - \alpha}{2} + \delta$ | The calibration angle which is used to control the robot to rotate counterclockwise is $\frac{\beta - \alpha}{2} - \delta$ |
| Counterclockwise | The calibration angle which is used to control the robot clockwise to rotate is $\frac{\beta - \alpha}{2} - \delta$ | The calibration angle which is used to control the robot clockwise to rotate is $\frac{\beta - \alpha}{2} + \delta$ |

Reference is made again to FIG. 4, after determining that the first distance and the second distance fall within which levels respectively, what type of the sensing target is going to be determined. As shown in TABLE 3 below, when the first distance and the second distance fall within the level "short" or "normal", a determination is made that the robot 100 is moving in the environment which is "the wall".

TABLE 3

| | distance condition | |
|---|---|---|
| The first distance | The second distance | Type of the sensing target |
| Short | Normal | Wall |
| Normal | Short | Wall |

In step S450, after the sensing target is identified as the wall, the flow chart goes to step S452 which is the procedure of controlling the robot 100 for moving along the wall.

Figure 7:
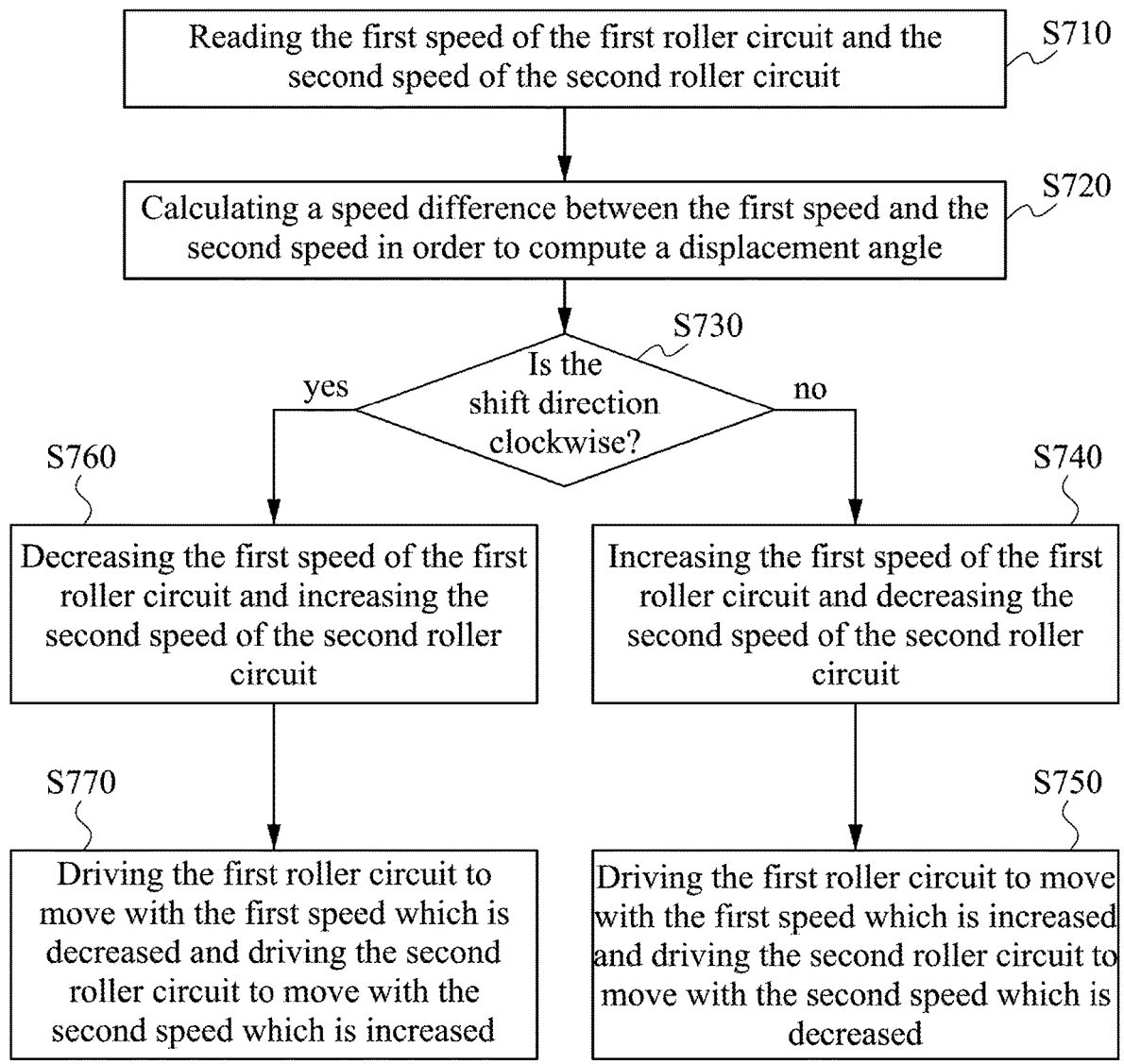
FIG. 7 is a flow chart illustrating that the sensing target is identified to be a wall and how to control the robot without colliding with the wall in accordance with some aspects of the present disclosure.

Reference is made to FIG. 7, which is a flow chart illustrating that the sensing target is identified to be the wall and how to control the robot 100 without colliding with the wall in accordance with some aspects of the present disclosure. Referring to both FIG. 3 and FIG. 7. In step S710, the processor 120 reads the first speed of the first roller circuit 143 and the second speed of the second roller circuit 145. In some embodiments, the processor 120 reads a moving speed of the first roller circuit 143 as the first speed and read a moving speed of the second roller circuit 145 as the second speed. In step S720, a speed difference between the first speed and the second speed is calculated in order to compute a displacement angle. For example, when the first speed of the first roller circuit 143 is larger than the second speed of the second roller circuit 145, it represents that the forward direction of the robot 100 shifts clockwise gradually. On the other hand, when the first speed of the first roller circuit 143 is smaller than the second speed of the second roller circuit 145, it represents that the forward direction of the robot 100 shifts counterclockwise gradually. In step S730, a determination will be made whether the shift direction is clockwise.

If the determination is made that the shift direction is rotating counterclockwise and the wall locates on the left side of the robot 100, in step S740, the first speed of the first roller circuit 143 is increased and the second speed of the second roller circuit 145 is decreased. And then in step S750, the driving circuit 130 drives the first roller circuit 143 to move with the first speed which is increased and drives the second roller circuit 145 to move with the second speed which is decreased, such that the forward direction of the robot 100 is corrected for moving along the wall.

In some embodiments, function (3) is applied to compute the first speed:

$$\text{first speed} = \text{speed} + \frac{\text{rotation}}{2}, \quad \text{function (3)}$$

which speed=$k_1 \times (d_w - d_{min})$, $d_w$ is the distance between the sensor and the wall, $d_{min}$ is a safe distance between the sensor and the wall, $$\text{rotation} = k_2 \times \frac{W}{\text{speed}} (d_w - d_t),$$

$d_t$ is a target distance between the sensor and the wall, which $d_{min} < d_t < f$, and f is a detecting distance which is acquired by the sensor.

In some embodiments, function (4) is applied to compute the second speed:

$$\text{second speed} = \text{speed} - \frac{\text{rotation}}{2}. \quad \text{function (4)}$$

If the determination is made that the shift direction is rotating clockwise and the wall locates on the left side of the robot 100, in step S760, the first speed of the first roller circuit 143 is decreased and the second speed of the second roller circuit 145 is increased. And then in step S770, the driving circuit 130 drives the first roller circuit 143 to move with the first speed which is decreased and drives the second roller circuit 145 to move with the second speed which is increased, such that the forward direction of the robot 100 is corrected for moving along the wall. In some embodiments, the first speed is calculated by applying function (4) and the second speed is calculated by function (3).

Reference is made to FIG. 4 again, after determining that the first distance and the second distance fall within which levels respectively, what type of the sensing target is going to be determined. As shown in TABLE 4 below, when the first distance and the second distance fall within the level "long" or "normal", a determination is made that the robot 100 is moving in the environment which is "the cliff".

TABLE 4

| | distance condition | |
|---|---|---|
| The first distance | The second distance | Type of the sensing target |
| Long | Normal | Cliff |
| Normal | Long | Cliff |

In step S460, after the sensing target is identified as the cliff, the flow chart goes to step S462, which is the procedure of controlling the robot 100 for moving aside the cliff.

Figure 8:
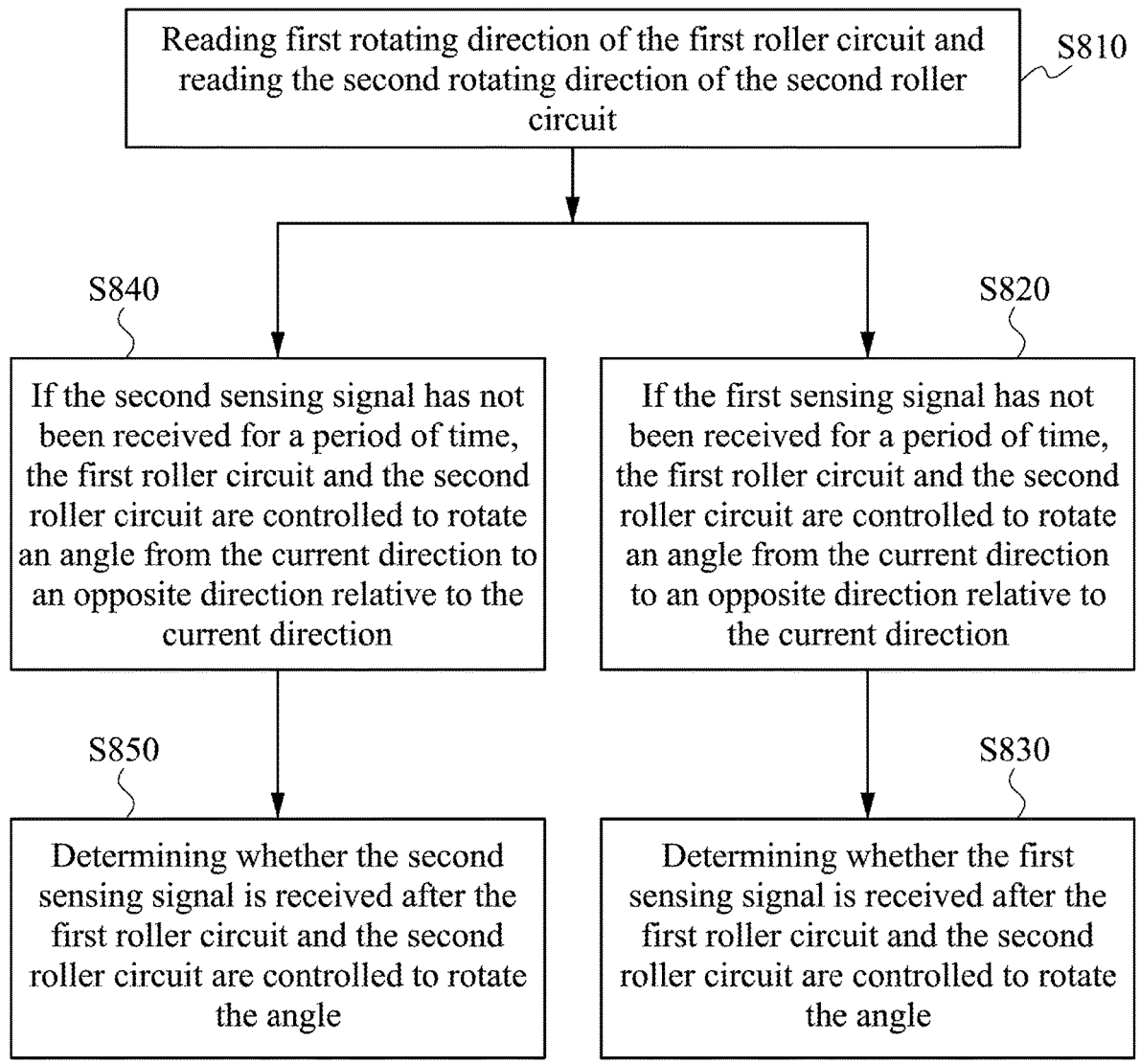
FIG. 8 is a flow chart illustrating that the sensing target is identified to be a cliff and how to control the robot without getting stuck in the cliff or falling down the cliff in accordance with some aspects of the present disclosure.

Reference is made to FIG. 8 is a flow chart illustrating that the sensing target is identified to be a cliff and how to control the robot 100 without getting stuck in the cliff or falling down the cliff in accordance with some aspects of the present disclosure. Referring to both FIG. 3 and FIG. 8. In step S810, the processor 120 reads first rotating direction when the first roller circuit 143 moves and reads the second rotating direction when the second roller circuit 145 moves. And then in step S820, if a determination is made that the first sensing signal has not been received for a period of time, it represents that one side of the first sensor 113 (such as the left side of the robot 100) faces a boundless space (relative to the robot 100) without ground or floor (i.e., the cliff). In this case, the first roller circuit 143 and the second roller circuit 145 are controlled to rotate an angle from the current direction to an opposite direction relative to the current direction, such that the face of the robot 100 departs from the boundless space. In step S830, a determination is made whether the first sensing signal can be received after the first roller circuit 143 and the second roller circuit 145 are controlled to rotate the angle. If the first sensing signal can be received, it represents that the face of the robot 100 has departed from the cliff. If the first sensing signal still cannot be received, it represents that the robot 100 still faces the cliff. In this case, the flow chart goes back to step S810 for departing from the cliff.

On the other hand, in step S840, a determination is made that the second sensing signal has not been received for a period of time, it represents that one side of the second sensor 115 (such as the right side of the robot 100) faces the boundless space (relative to the robot 100). In this case, the first roller circuit 143 and the second roller circuit 145 are controlled to rotate an angle from the current direction to an opposite direction relative to the current direction, such that the face of the robot 100 departs from the boundless space. In step S850, a determination is made whether the second sensing signal can be received after the first roller circuit 143 and the second roller circuit 145 are controlled to rotate the angle. If the second sensing signal can be received, it represents that the face of the robot 100 has departed from the cliff. If the second sensing signal still cannot be received, it represents that the robot 100 still faces the cliff. In this case, the flow chart goes back to step S810 for departing from the cliff.

In some embodiments, if the cliff has not been detected, the robot 100 starts to move forward for a distance, such as the distance calculated from function (5):

$$f' - \frac{L}{2}, \qquad \text{function (5)}$$

where f' is a length from the center point C of FIG. 1 to the sensor's detecting range.

As described above, the present disclosure provides the robot 100 and the robot control method for preventing from obstacles, and procedures for different types of sensing target are designed for preventing from different types of obstacles. Accordingly, the robot 100 can propel itself and prevent from getting stuck in difficult environment, furthermore the robot 100 can leave difficult environment by itself and find the best path to get across the difficult environment, and the operation property of the robot 100 is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A robot, comprising:
a sensing circuit comprising a first sensor and a second sensor, wherein the first sensor and the second sensor are configured to receive a first sensing signal and a second sensing signal respectively;
a driving circuit configured to control an operation of a roller circuit and a forward direction of the roller circuit; and
a processor coupled to the sensing circuit and the driving circuit, wherein when the processor determines that, according to the first sensing signal and the second sensing signal, a sensing target is a bridge, the processor controls the roller circuit through the driving circuit to adjust the forward direction, such that the robot gets across the bridge;
wherein the processor is configured to determine, according to the first sensing signal, a first distance between the first sensor and the sensing target, and configured to determine, according to the second sensing signal, a second distance between the second sensor and the sensing target, wherein the processor is configured to determine, according to the first distance and the second distance, whether the sensing target is the bridge.

2. The robot of claim 1, wherein when the sensing target is determined to be the bridge, the processor is further configured to:
control the driving circuit to drive the roller circuit to rotate from a first direction to a second direction, and record a first angle between the first direction and the second direction, wherein the first sensor detects a first side of the bridge in the second direction;
control the driving circuit to drive the roller circuit to rotate from the second direction to a third direction, and record a second angle between the first direction and the third direction, wherein the first sensor detects a second side of the bridge in the third direction;
compute a calibration angle according to the first angle and the second angle, wherein the second angle is larger than the first angle; and
control the driving circuit to adjust the forward direction of the roller circuit by the calibration angle.

3. The robot of claim 2, further comprising a housing, wherein the housing is configured to accommodate the sensing circuit, wherein a sensing included angle is between a center of the housing and a sensing direction of the sensing circuit, and the processor is further configured to compute an average difference of the second angle and the first angle, and configured to obtain the calibration angle by computing a sum of the average difference and the sensing included angle.

4. The robot of claim 1, wherein when the processor determines that a pavement width of the bridge is larger than a width of a housing of the robot, the processor controls the driving circuit to drive the roller circuit to get through the bridge.

5. The robot of claim 1, wherein the processor identifies that the sensing target is the bridge when the processor makes one of following determinations:
the first distance being smaller than a first threshold, and the second distance being larger than a second threshold;
the first distance being larger than the second threshold, and the second distance being smaller than the first threshold;
the first distance and the second distance being smaller than first threshold; and
the second distance and the second distance being larger than the second threshold;
wherein the second threshold is larger than the first threshold.

6. The robot of claim 1, wherein the roller circuit comprises a first roller circuit and a second roller circuit, wherein the processor is further configured to:
read a moving speed of the first roller circuit as a first speed and read a moving speed of the second roller circuit as a second speed in response to making a determination that the sensing target is identified as a wall according to the first sensing signal and the second sensing signal;
compute a speed difference between the first speed and the second speed in order to compute a displacement angle of the forward direction before and after the first roller circuit and the second roller circuit move; and
adjust a speed of the first roller circuit and a speed of the second roller circuit according to the displacement angle.

7. The robot of claim 6, wherein when the processor adjusts the speed of the first roller circuit and the speed of the second roller circuit, the processor is further configured to:

increase the first speed of the first roller circuit and decrease the second speed of the second roller circuit in response to determining that the wall locates on a left side of the first sensor and a first rotating direction is counterclockwise; and control the driving circuit to drive the first roller circuit to move in the first rotating direction with the first speed which is increased, and to drive the second roller circuit to move in a second rotating direction with the second speed which is decreased.

8. The robot of claim 6, wherein when the processor determines that the forward direction does not keep a fixed distance from the wall, the processor is further configured to:

decrease the first speed of the first roller circuit and increase the second speed of the second roller circuit when the wall locates on a left side of the first sensor and a first rotating direction is clockwise; and control the driving circuit to drive the first roller circuit to move in the first rotating direction with the first speed which is decreased, and control the second roller circuit to move in a second rotating direction with the second speed which is increased.

9. The robot of claim 1, wherein the roller circuit comprises a first roller circuit and a second roller circuit, and the processor is further configured to identify that the sensing target is a cliff when the first sensor does not received the first sensing signal or the second sensor does not received the second sensing signal.

10. A robot control method, comprising:

receiving a first sensing signal of a first sensor and a second sensing signal of a second sensor;

when a determination is made, according to the first sensing signal and the second sensing signal, that a sensing target is a bridge, controlling a driving circuit to driving a roller circuit to adjust a forward direction such that the robot gets through bridge; and when a determination is made that a pavement width of the bridge is larger than a width of a housing of the robot, controlling the driving circuit to drive the roller circuit to get through the bridge.

11. The robot control method of claim 10, further comprising:

determining, according to the first sensing signal, a first distance between the first sensor and the sensing target;

determining, according to the second sensing signal, a second distance between the second sensor and the sensing target; and determining, according to the first distance and the second distance, whether the sensing target is the bridge.

12. The robot control method of claim 11, further comprising:

when the sensing target is determined to be the bridge, controlling the driving circuit to control the roller circuit to rotate from a first direction to a second direction, and recording a first angle between the first direction and the second direction, wherein the first sensor detects a first side of the bridge in the second direction;

controlling the driving circuit to drive the roller circuit to rotate from the second direction to a third direction, and recording a second angle between the first direction and the third direction, wherein the first sensor detects a second side of the bridge in the third direction;

computing a calibration angle according to the first angle and the second angle, wherein the second angle is larger than the first angle; and controlling the driving circuit to adjust the forward direction of the roller circuit by the calibration angle.

13. The robot control method of claim 12, further comprising:

computing an average difference of the second angle and the first angle, and obtaining the calibration angle by computing a sum of the average difference and a sensing included angle, wherein the sensing included angle is between a center of a housing and a sensing direction of a sensing circuit.

14. The robot control method of claim 12, wherein the sensing target is identified to be the bridge when one of following determinations is made:

the first distance being smaller than a first threshold and the second distance is larger than a second threshold;

the first distance being larger than the second threshold and the second distance is smaller than the first threshold;

the first distance and the second distance being smaller than first threshold; and the second distance and the second distance being larger than the second threshold;

wherein the second threshold is larger than the first threshold.

15. The robot control method of claim 10, further comprising:

reading a moving speed of a first roller circuit as a first speed and reading a moving speed of a second roller circuit as a second speed in response to making a determination that the sensing target is identified as a wall according to the first sensing signal and the second sensing signal;

computing a speed difference between the first speed and the second speed in order to compute a displacement angle of the forward direction before and after the first roller circuit and the second roller circuit move; and adjusting a speed of the first roller circuit and a speed of the second roller circuit according to the displacement angle.

16. The robot control method of claim 15, wherein step of adjusting the speed of the first roller circuit and the speed of the second roller circuit further comprising:

increasing the first speed of the first roller circuit and decreasing the second speed of the second roller circuit in response to determining that the wall locates on a left side of the first sensor and a first rotating direction is counterclockwise; and controlling the driving circuit to drive the first roller circuit to move in the first rotating direction with the first speed which is increased and to drive the second roller circuit to move in a second rotating direction with the second speed which is decreased.

17. The robot control method of claim 15, wherein step that the forward direction does not keep a fixed distance from the wall further comprising:

decreasing the first speed of the first roller circuit and increasing the second speed of the second roller circuit when the wall locates on a left side of the first sensor and a first rotating direction is clockwise; and controlling the driving circuit to drive the first roller circuit to move in the first rotating direction with the first speed which is decreased and controlling the second roller circuit to move in a second rotating direction with the second speed which is increased.

18. The robot control method of claim 10, further comprising:
  identifying that the sensing target is a cliff when the first sensor does not received the first sensing signal or the second sensor does not received the second sensing signal.

* * * * *